United States Patent
Chen et al.

(10) Patent No.: US 7,210,842 B2
(45) Date of Patent: May 1, 2007

(54) FLAT DISPLAY AND BACKLIGHT MODULE THEREOF

(75) Inventors: Shin-Li Chen, Linnei Township, Yunlin County (TW); Chung-Te Lee, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 55 days.

(21) Appl. No.: 11/063,278

(22) Filed: Feb. 22, 2005

(65) Prior Publication Data

US 2006/0098457 A1 May 11, 2006

(30) Foreign Application Priority Data

Nov. 9, 2004 (TW) .............................. 93134087 A

(51) Int. Cl.
*F21V 7/04* (2006.01)
(52) U.S. Cl. ...................... 362/632; 362/218; 362/219; 362/373; 362/633
(58) Field of Classification Search ................ 362/218, 362/219, 345, 373, 600, 632, 633, 634
See application file for complete search history.

(56) References Cited

U.S. PATENT DOCUMENTS 5,831,374 A * 11/1998 Morita et al. ................. 313/46
2004/0032725 A1 * 2/2004 Hsieh et al. .................. 362/31
2006/0104067 A1 * 5/2006 Hwang et al. .............. 362/373

FOREIGN PATENT DOCUMENTS

| JP | 63005321 | 1/1988 |
|----|----------|--------|
| TW | 200530690 | 3/1993 |

OTHER PUBLICATIONS

China Office Action mailed Nov. 10, 2006.

* cited by examiner

*Primary Examiner*—Stephen F Husar
*Assistant Examiner*—Meghan K. Dunwiddie
(74) *Attorney, Agent, or Firm*—Thomas, Kayden, Horstemeyer & Risley

(57) ABSTRACT

A flat display and backlight module thereof are disclosed. The flat display includes a backlight module disposed on a rear surface of a display panel. The backlight module comprises lamps, a reflector, and a diffuser disposed on a back bezel. The reflector is attached on the back bezel. The diffuser and reflector form an enclosed space for the lamps, providing required light for the display panel. The back bezel comprises at least one outer surface with a plurality of fins extending therefrom to increase effective dissipation area thereof.

13 Claims, 3 Drawing Sheets

FLAT DISPLAY AND BACKLIGHT MODULE THEREOF

BACKGROUND

The present invention relates to a backlight module, and in particular to a backlight module with thermal dissipation fins.

In a liquid crystal display, a backlight module is generally utilized as a light source. With different positions of light sources, the backlight module can be divided into a sidelight and a direct backlight module.

FIG. 1 is an exploded perspective view of a conventional direct type backlight module. In FIG. 1, a direct backlight module 10 includes a back bezel 11, a reflector 12, a diffuser 15, two fixing rims 13a and 13b, and a plurality of lamps 14 as light sources. The reflector 12 is disposed on the back bezel 11 and comprises a surface with high reflectivity to increase illumination of the backlight module 10. Conventional direct backlight modules utilize cold cathode fluorescent lamps as light sources. To assemble the backlight module 10, the lamps 14 pass through the holes 132 of the fixing rims 13a and 13b. Simultaneously, the fixing rims 13a and 13b are fixed on the opposite sides of the back bezel 11 by the hooks 134 engaging with the notches 112. The diffuser 15 is disposed above the reflector 12, covering the opening thereof. Thus, the light provided by the lamps 14 can be completely reflected upward and pass through the diffuser 15, providing required uniform illumination of the large-sized LCD panel.

Furthermore, conventional direct backlight modules 10 may have optical films, such as prism films, of which the descriptions are omitted.

In conventional direct backlight module, the back bezel is aluminum and utilized to absorb lots of heat produced by lamps. The hot air is concentrated at the top portion of the backlight module because of heat convection effect (at the top left side of the back bezel 11 in FIG. 1). Thus, local temperature at the top portion of the backlight module is relatively higher than that at the other portion therein, and high temperature reduces the light emitting efficiency of the lamps and causes non-uniform illumination of the backlight module.

SUMMARY

In order to address the disadvantages of the aforementioned backlight module, an embodiment of the invention provides a direct backlight module with thermal dissipation structure to reduce local high temperature therein and to provide uniform illumination thereof.

Accordingly, an embodiment of the invention provides a backlight module comprising a back bezel with a plurality of fins extending from at least one end surface to increase the effective thermal dissipation area thereof.

The backlight module comprises a plurality of lamps, a reflector, and a diffuser. An enclosed space is formed by the reflector and the diffuser. The lamps are disposed in the enclosed space. Furthermore, the fins are substantially perpendicular to the end surface and extending in the direction away from the lamps. The intervals of the fins are substantially equal. The back bezel and the fins are formed as a whole and made by sheet-metal shaping.

The embodiment of the invention also provides a flat display comprising a display panel and a backlight module disposed under the display panel. The backlight module comprises a plurality of lamps, a reflector, and a diffuser disposed on a back bezel. An enclosed space is formed between the reflector and the diffuser. The back bezel comprises a plurality of fins on at least one end surface to increase effective thermal dissipation area thereof.

A detailed description is given in the following embodiments with reference to the accompanying drawings.

DESCRIPTION OF THE DRAWINGS

The present invention can be more fully understood by the subsequent detailed description and examples with references to the accompanying drawings which are given by way of illustration only, and thus are not limitations of the present invention, and wherein.

DETAILED DESCRIPTION

Figure 1:
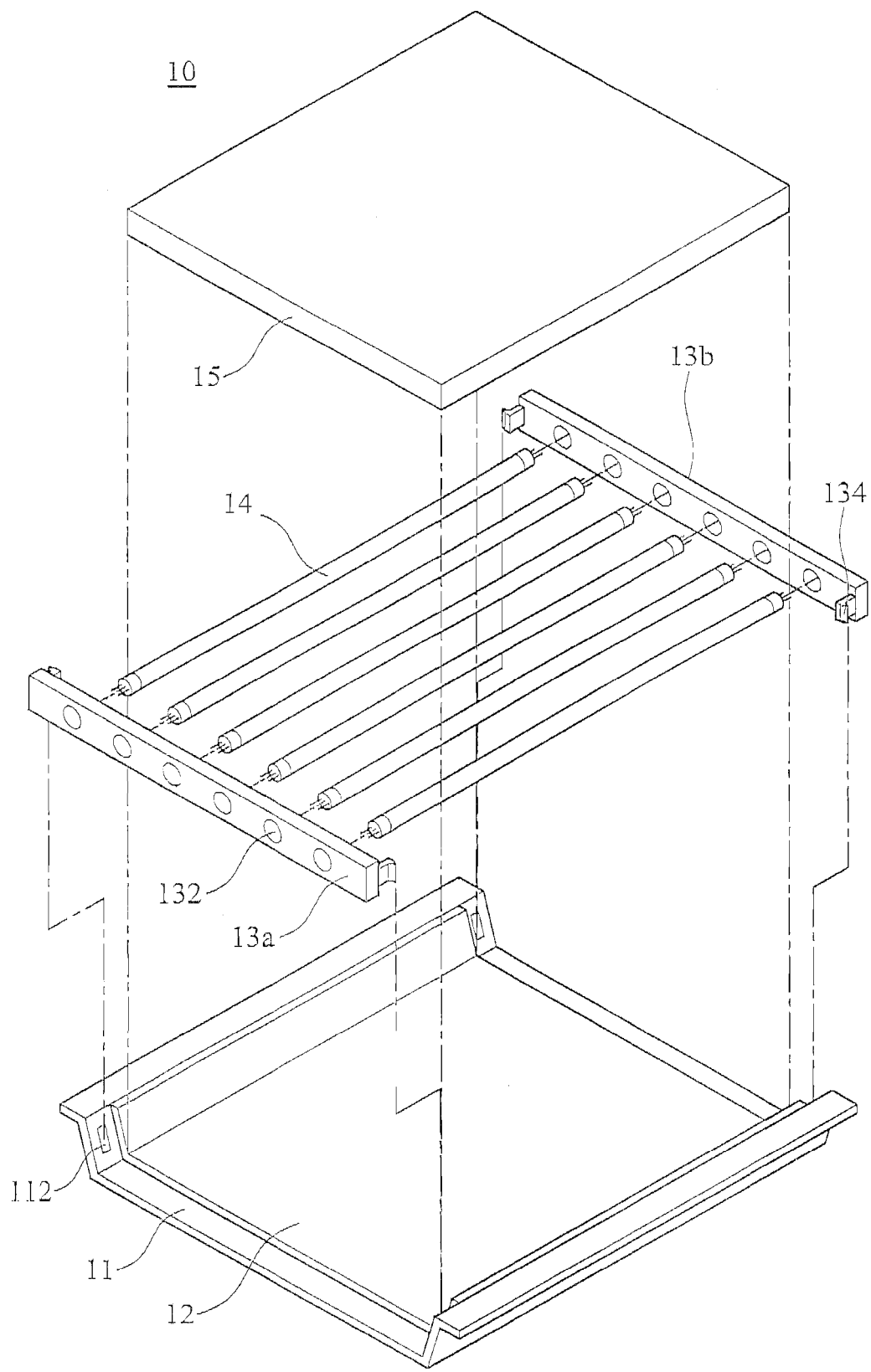
FIG. 1 is an exploded perspective view of a conventional direct backlight module.
Figure 2:
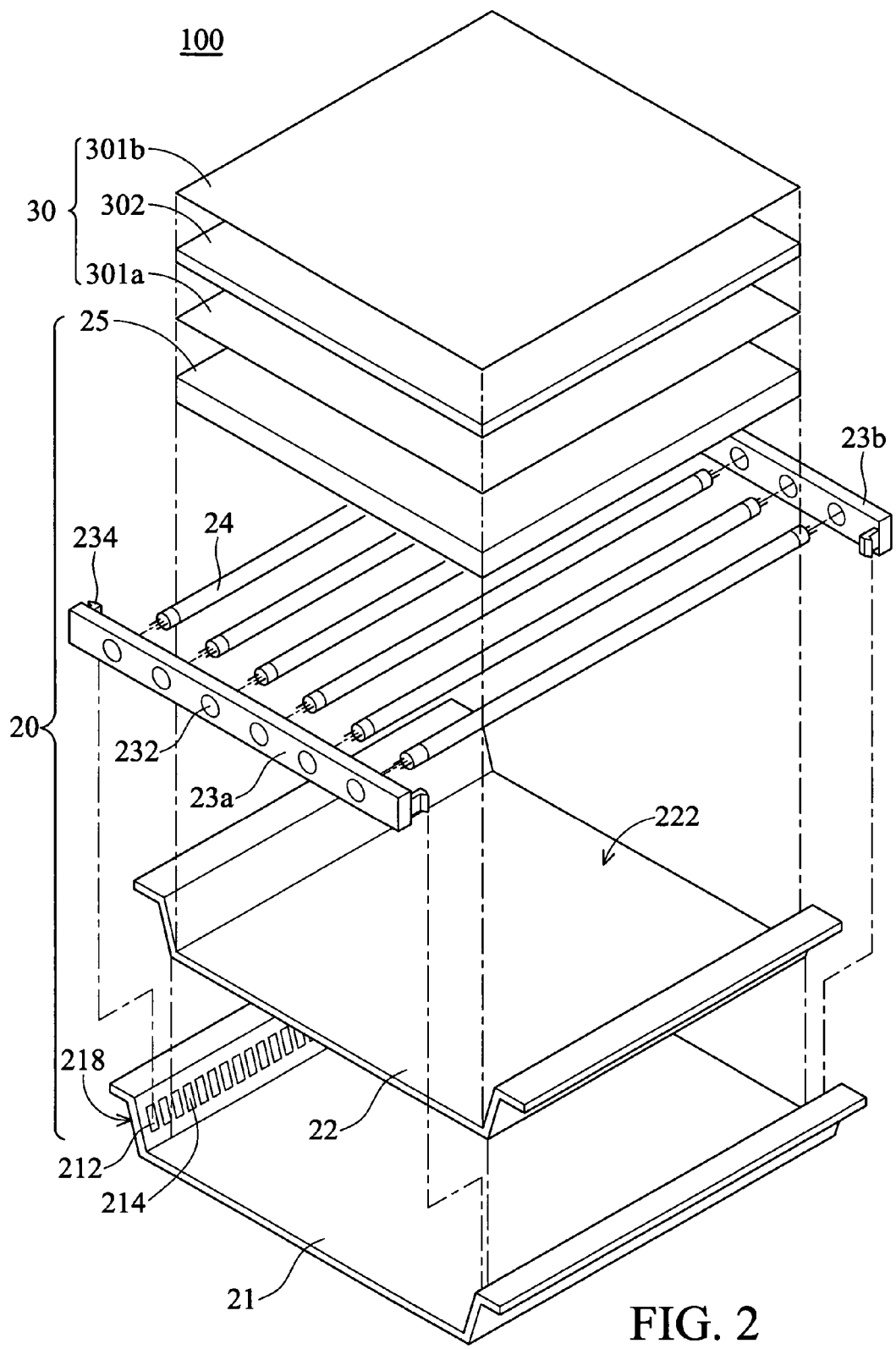
FIG. 2 is an exploded perspective view of a direct backlight module of an embodiment of the invention.

FIG. 2 is an exploded perspective view of a direct backlight module of an embodiment of the invention. The flat display 100 comprises a display panel 30 and a backlight module 20 disposed under the display panel. The display panel 30 further comprises two polarizing films 301a and 301b, and a liquid crystal display panel 302, or other flat display panel is disposed therebetween.

In FIG. 2, the backlight module 20 comprises a back bezel 21, a reflector 22, a diffuser 25, two fixing rims 23a and 23b, and a plurality of lamps 24. The reflector 22 is disposed the back bezel 21 and comprises a surface with high reflectivity to increase illumination of the backlight module 20. The lamps 24 are cold cathode fluorescent lamps. To assemble the backlight module 20, the lamps 24 pass through the holes 232 of the fixing rims 23a and 23b. The fixing rims 23a and 23b are fixed, simultaneously, on the opposite sides of the back bezel 21 by the hooks 234 engaging with the notches 212. The diffuser 25 is disposed above the reflector 22 and an enclosed space 222 is formed therebetween. Thus, the light provided by the lamps 24 can be completely reflected upward and pass through the diffuser 25, providing required uniform illumination of the LCD panel 30.

Figure 3:
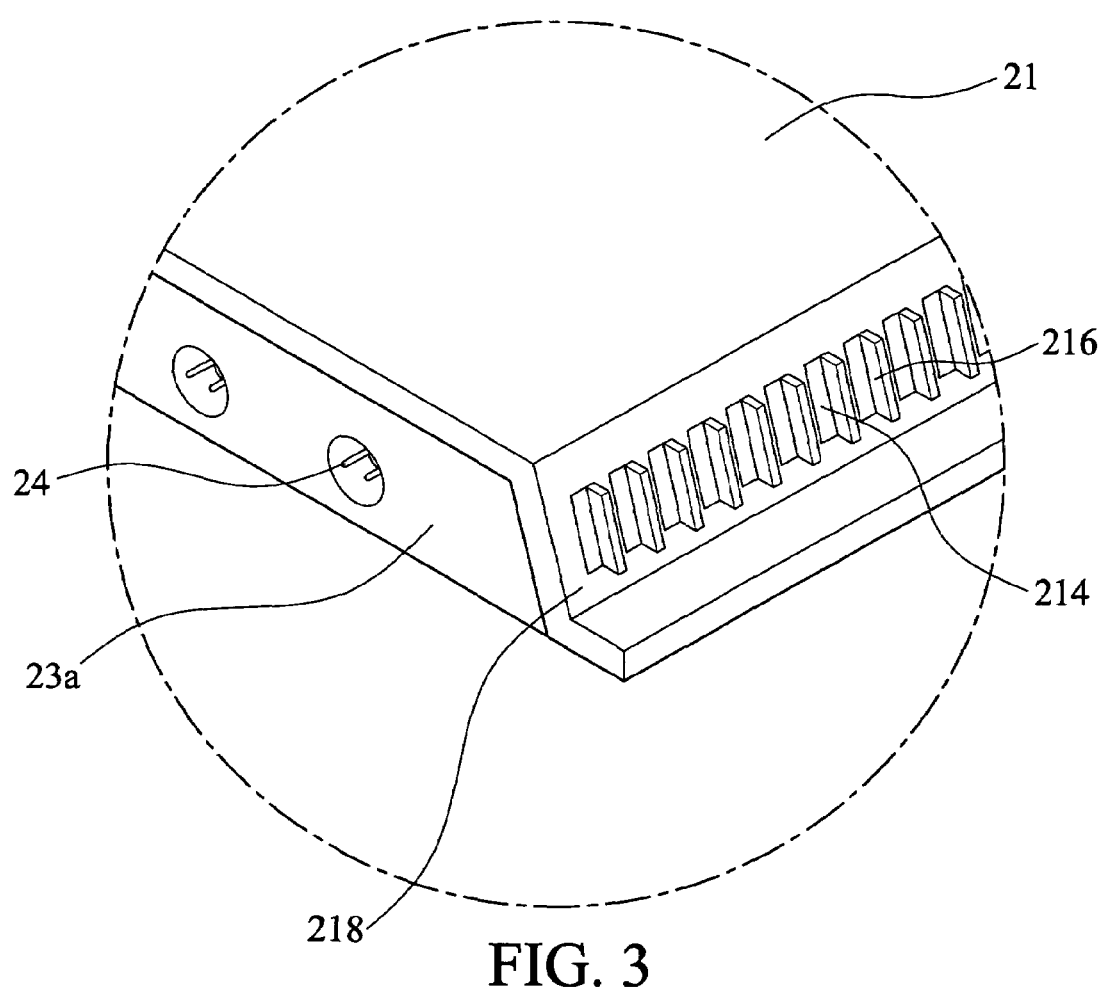
FIG. 3 is an enlarged schematic view of the back side of the back bezel in FIG. 2.

FIG. 3 shows the back side of the back bezel 21 in FIG. 2. In order to reduce local high temperature at the top portion of the backlight module 20, as shown at the top left side of the back bezel 21 in FIG. 2, the back bezel 21 of the invention comprises a plurality of fins 216 protruding in the direction opposite the lamps 24. The fins 216 increase the effective dissipation area of the back bezel 21 and change the thermal boundary layer surrounding the end surface 218, which can increase the heat convection efficiency and reduce local high temperature caused by convection in the enclosed space near the top portion of the backlight module 20.

Preferably, the fins 216 and the back bezel 21 are formed as a whole by a sheet-metal shaping process. The fins 216 are perpendicular to, or tilt by a predetermined angle from, the end surface 218, Moreover, the intervals between each two fins 216 are equal. The fins 216 also can be formed on the entire or part of the other end surfaces to optimize heat dissipation.

Furthermore, in order to completely reflect light provided by lamps 24, the reflector 22 is directly attached to the back bezel 21, covering the through holes 214 produced by sheet-metal shaping to form the fins 216 and prevent emitted light from escaping. Thus, the improved thermal dissipation structure of the backlight module 20 can increase the effective thermal dissipation area of the thermal boundary layer and reduce local high temperature in the backlight module 20 without affecting the illumination thereof.

While the present invention has been described by way of example and in terms of the preferred embodiments, it is to be appreciated that the present invention is not limited to the disclosed embodiments. Rather, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flat display, comprising:
   a display panel;
   a backlight module disposed under the display panel, comprising:
   a back bezel having at least one end surface, wherein the at least one end surface is non-parallel with the display panel and has a plurality of fins;
   a reflector disposed on the back bezel;
   a diffuser disposed above the reflector, and an enclosed space formed therebetween; and
   a plurality of lamps disposed in the enclosed space.

2. The flat display as claimed in claim 1, wherein the fins and the back bezel are formed as a whole.

3. The flat display as claimed in claim 1, wherein the fins are substantially disposed in the direction away from the lamps.

4. The flat display as claimed in claim 1, wherein the intervals between each fin are substantially equal.

5. The flat display as claimed in claim 1, wherein the fins are substantially perpendicular to the end surface.

6. The flat display as claimed in claim 1, wherein the end surface comprises a plurality of through holes, and each through hole is corresponding to one of the fins.

7. A backlight module, comprising:
   a back bezel having at least one end surface with a plurality of fins extending from the end surface;
   a plurality of lamps disposed on the back bezel;
   a reflector disposed between the lamps and the back bezel; and
   a diffuser disposed on the back bezel, non-parallel with the end surface.

8. The backlight module as claimed in claim 7, further comprising a diffuser disposed above the reflector and an enclosed space formed therebetween, wherein the lamps are disposed in the enclosed space.

9. The backlight module as claimed in claim 7, wherein the fins and the back bezel are formed as a whole.

10. The backlight module as claimed in claim 7, wherein the fins extending from the end surface are substantially in the direction away from the lamps.

11. The backlight module as claimed in claim 7, wherein the intervals between each fin are substantially equal.

12. The backlight module as claimed in claim 7, wherein the fins are substantially perpendicular to the end surface.

13. The backlight module as claimed in claim 7, wherein the end surface comprises a plurality of through holes, and each through hole is corresponding to one of the fins.

* * * * *